United States Patent
Porter et al.

(10) Patent No.: US 11,009,230 B2
(45) Date of Patent: May 18, 2021

(54) UNDERCUT COMBUSTOR PANEL RAIL

(71) Applicant: UNITED TECHNOLOGIES CORPORATION, Farmington, CT (US)

(72) Inventors: Steven D Porter, Wethersfield, CT (US); Jon E Sobanski, Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 125 days.

(21) Appl. No.: 15/889,793

(22) Filed: Feb. 6, 2018

(65) Prior Publication Data
US 2019/0242580 A1    Aug. 8, 2019

(51) Int. Cl.
| | |
|---|---|
| *F23R 3/00* | (2006.01) |
| *F23R 3/60* | (2006.01) |
| *F23R 3/50* | (2006.01) |

(52) U.S. Cl.
CPC .............. *F23R 3/002* (2013.01); *F23R 3/50* (2013.01); *F23R 3/60* (2013.01); *F23R 2900/00017* (2013.01); *F23R 2900/00018* (2013.01); *F23R 2900/03043* (2013.01); *F23R 2900/03044* (2013.01)

(58) Field of Classification Search
CPC .. F23R 3/002; F23R 3/06; F23R 2900/03041; F23R 2900/03042; F23R 2900/03044
See application file for complete search history.

(56) References Cited

U.S. PATENT DOCUMENTS

| | | |
|---|---|---|
| 4,158,949 A | 6/1979 | Reider |
| 4,242,871 A | 1/1981 | Breton |
| 5,079,915 A | 1/1992 | Veau |
| 5,419,681 A | 5/1995 | Lee |
| 6,029,455 A | 2/2000 | Sandelis |
| 6,810,673 B2 | 11/2004 | Snyder |
| 7,812,282 B2 | 10/2010 | Kuhn et al. |
| 8,291,709 B2 | 10/2012 | Cayre et al. |
| 9,518,739 B2 | 12/2016 | Hu |
| 9,555,470 B1 | 1/2017 | Heneveld et al. |

(Continued)

FOREIGN PATENT DOCUMENTS

| | | |
|---|---|---|
| DE | 102007000516 | 5/2008 |
| EP | 1503144 | 2/2005 |

(Continued)

OTHER PUBLICATIONS

Porter et al, U.S. Appl. No. 15/889,764, filed Feb. 6, 2018 and entitled Pull-Plane Effusion Combustor Panel.

(Continued)

*Primary Examiner* — Katheryn A Malatek
(74) *Attorney, Agent, or Firm* — Snell & Wilmer L.L.P.

(57) ABSTRACT

A heat shield panel for a gas turbine engine combustor is disclosed. The heat shield panel includes a hot side defining a first surface having an outer perimeter, a cold side defining a second surface spaced from the first surface, a rail member disposed on the cold side proximate a first portion of the outer perimeter, the rail member having an outer wall and an inner wall, an undercut portion within the second surface proximate the inner wall of the rail member and an orifice extending through the rail member, from the inner wall to the outer wall.

16 Claims, 6 Drawing Sheets

(56) References Cited

U.S. PATENT DOCUMENTS

| | | |
|---|---|---|
| 9,752,447 B2 | 9/2017 | Clum et al. |
| 2001/0005555 A1 | 6/2001 | Kreis |
| 2002/0124572 A1 | 9/2002 | Pidcock |
| 2004/0146399 A1 | 7/2004 | Bolms et al. |
| 2006/0059916 A1 | 3/2006 | Cheung |
| 2007/0245742 A1* | 10/2007 | Dahlke .................. F23R 3/005 60/754 |
| 2007/0283700 A1 | 12/2007 | Gerendas |
| 2008/0271457 A1 | 11/2008 | Mc Masters |
| 2009/0077974 A1 | 3/2009 | Dahlke |
| 2009/0199837 A1 | 8/2009 | Tschirren |
| 2010/0095679 A1 | 4/2010 | Rudrapatna |
| 2011/0197590 A1 | 8/2011 | Bottcher |
| 2012/0272652 A1 | 11/2012 | Nicholls |
| 2014/0096528 A1 | 4/2014 | Cunha et al. |
| 2014/0238030 A1 | 8/2014 | Gerendas |
| 2014/0290258 A1 | 10/2014 | Gerendas et al. |
| 2015/0027127 A1 | 1/2015 | Clemen |
| 2015/0292741 A1 | 10/2015 | Cunha et al. |
| 2015/0354818 A1 | 12/2015 | Lebel |
| 2015/0377033 A1 | 12/2015 | Xu |
| 2016/0003056 A1 | 1/2016 | Xu |
| 2016/0054001 A1* | 2/2016 | Bangerter ............... F23R 3/005 60/772 |
| 2016/0097285 A1 | 4/2016 | Harding |
| 2016/0097325 A1 | 4/2016 | Harding et al. |
| 2016/0102860 A1 | 4/2016 | Chandler |
| 2016/0177758 A1 | 6/2016 | Clum et al. |
| 2016/0193667 A1 | 7/2016 | Luketic |
| 2016/0208704 A1 | 7/2016 | Bouldin |
| 2016/0230996 A1 | 8/2016 | Kostka |
| 2016/0238253 A1 | 8/2016 | Moura |
| 2016/0245094 A1 | 8/2016 | Bunker |
| 2016/0252249 A1 | 9/2016 | Erbas-Sen |
| 2016/0258626 A1 | 9/2016 | Moura |
| 2016/0265775 A1 | 9/2016 | Cunha |
| 2016/0273363 A1 | 9/2016 | Bunker |
| 2016/0273772 A1 | 9/2016 | Cunha et al. |
| 2016/0305325 A1 | 10/2016 | Cunha |
| 2016/0377289 A1 | 12/2016 | Kostka, Jr. |
| 2017/0009987 A1 | 1/2017 | McKinney |
| 2017/0114798 A1 | 4/2017 | Spangler |
| 2017/0205069 A1 | 7/2017 | Tentorio |
| 2017/0227220 A1 | 8/2017 | Schilp et al. |
| 2017/0241643 A1 | 8/2017 | Mulcaire |
| 2017/0276356 A1 | 9/2017 | Mulcaire |
| 2017/0298743 A1 | 10/2017 | Webster |
| 2017/0356653 A1 | 12/2017 | Bagchi |
| 2018/0073736 A1 | 3/2018 | Papple |
| 2018/0238545 A1 | 8/2018 | Quach |
| 2018/0238547 A1 | 8/2018 | Quach |
| 2018/0335212 A1 | 11/2018 | Quach |
| 2019/0242580 A1 | 8/2019 | Porter |
| 2019/0257206 A1 | 8/2019 | Weebster |
| 2019/0285276 A1 | 9/2019 | Porter |
| 2020/0033003 A1 | 1/2020 | Gerendas |
| 2020/0041126 A1 | 2/2020 | Anderson |

FOREIGN PATENT DOCUMENTS

| | | |
|---|---|---|
| EP | 2012531 | 4/2016 |
| EP | 3088100 | 11/2016 |
| EP | 3112755 | 1/2017 |
| EP | 3183497 | 6/2017 |
| GB | 2317005 | 3/1998 |
| WO | 2008017551 | 2/2008 |
| WO | 2014169127 | 10/2014 |
| WO | 2015108584 | 7/2015 |
| WO | 2015112220 | 7/2015 |
| WO | 2015112221 | 7/2015 |

OTHER PUBLICATIONS

Sobanski et al, U.S. Appl. No. 15/889,816, filed Feb. 6, 2018 and entitled Diffusing Hole Rail Effusion.
USPTO, Sobanski et al, U.S. Appl. No. 15/902,171, filed Feb. 22, 2018 and entitled Multi-Direction Hole for Rail Effusion.
European Patent Office, European Search Report dated Mar. 6, 2019 in Application No. 19154252.1.
European Patent Office, European Search Report dated Mar. 21, 2019 in Application No. 19155472.4.
European Patent Office, European Search Report dated Apr. 3, 2019 in Application No. 19156740.3.
European Patent Office, European Search Report dated Jun. 13, 2019 in Application No. 19154249.7.
European Patent Office, European Search Report dated Sep. 16, 2019 in Application No. 19154249.7.
USPTO, Restriction/Election Requirement dated Dec. 12, 2019 in U.S. Appl. No. 15/889,764.
USPTO, Restriction/Election Requirement dated Dec. 13, 2019 in U.S. Appl. No. 15/889,816.
USPTO, Restriction/Election Requirement dated Nov. 1, 2019 in U.S. Appl. No. 15/902,171.
USPTO, Restriction/Election Requirement dated Jan. 16, 2020 in U.S. Appl. No. 15/902,171.
USPTO, Pre-Interview First Office Action dated Apr. 14, 2020 in U.S. Appl. No. 15/889,764.
USPTO, Pre-Interview First Office Action dated May 4, 2020 in U.S. Appl. No. 15/902,171.
USPTO, Pre-Interview First Office Action dated Feb. 25, 2020 in U.S. Appl. No. 15/889,816.
USPTO, First Action Interview Office Action dated Jun. 16, 2020 in U.S. Appl. No. 15/889,816.
European Patent Office, European Office Action dated Jun. 19, 2020 in Application No. 19154249.7.
USPTO, First Action Interview Office Action dated Jul. 1, 2020 in U.S. Appl. No. 15/902,171.
USPTO, First Action Interview Office Action dated Aug. 5, 2020 in U.S. Appl. No. 15/889,764.
USPTO, Notice of Allowance dated Aug. 25, 2020 in U.S. Appl. No. 15/889,816.
USPTO, Final Office Action dated Nov. 4, 2020 in U.S. Appl. No. 15/902,171.

* cited by examiner

//UNDERCUT COMBUSTOR PANEL RAIL

FIELD

The present disclosure relates to gas turbine engines and, more particularly, to effusion panels and liners used in the combustors of gas turbine engines.

BACKGROUND

Gas turbine engines, such as those that power modern commercial and military aircraft, include a fan section to propel the aircraft, a compressor section to pressurize a supply of air from the fan section, a combustor section to burn a hydrocarbon fuel in the presence of the pressurized air, and a turbine section to extract energy from the resultant combustion gases and generate thrust.

The combustor section typically includes a bulkhead assembly, an inner liner assembly and an outer liner assembly. The bulkhead assembly extends radially between the inner liner assembly and the outer liner assembly to define a combustion chamber. Each liner assembly can be formed from one or more panels and one or more shells. Cooling cavities reside between the panels and the shells. The cooling cavities fluidly couple impingement apertures defined in the shells with effusion apertures defined in the panels.

SUMMARY

A heat shield panel for a gas turbine engine combustor is disclosed. The heat shield panel includes a hot side defining a first surface having an outer perimeter, a cold side defining a second surface spaced from the first surface, a rail member disposed on the cold side proximate a first portion of the outer perimeter, the rail member having an outer wall and an inner wall, an undercut portion of the second surface proximate the inner wall of the rail member and an orifice extending through the rail member, from the inner wall to the outer wall.

In various embodiments, the orifice includes an inner opening positioned on the inner wall, the inner opening having a portion disposed within the undercut portion. The orifice also includes an outer opening positioned on the outer wall, the outer opening positioned to direct a flow of air through the orifice toward an engine component positioned adjacent the rail member. In various embodiments, the engine component is a second panel positioned adjacent the rail member. In various embodiments, the outer opening is positioned closer to the first surface than the inner opening.

In various embodiments, the outer perimeter has a rectangular shape and the first surface and the second surface have an arcuate shape. In various embodiments, the rail member extends entirely about the rectangular shape of the outer perimeter. In various embodiments, the outer perimeter includes a first side and a second side spaced in a circumferential direction from the first side, the first side including a first rail and a first undercut portion proximate the first rail and the second side including a second rail and a second undercut portion proximate the second rail, the first rail having a first orifice extending there through and the second rail having a second orifice extending there through. In various embodiments, the outer perimeter includes a first side and a second side spaced in an axial direction from the first side, the first side including a first rail and a first undercut portion proximate the first rail and the second side including a second rail and a second undercut portion proximate the second rail, the first rail having a first orifice extending there through and the second rail having a second orifice extending there through.

In various embodiments, the outer perimeter includes a third side and a fourth side spaced in a circumferential direction from the third side, the third side including a third rail and a third undercut portion proximate the third rail and the fourth side including a fourth rail and a fourth undercut portion proximate the fourth rail, the third rail having a third orifice extending there through and the fourth rail having a fourth orifice extending there through. In various embodiments, the first rail includes a first plurality of orifices extending there through, the second rail includes a second plurality of orifices extending there through, the third rail includes a third plurality of orifices extending there through, and the fourth rail includes a fourth plurality of orifices extending there through.

A heat shield for use in a gas turbine engine combustor is disclosed. The heat shield includes a first panel and a second panel. In various embodiments, the first panel includes a first hot side surface having a first outer perimeter, a first cold side surface spaced from the first hot side surface, a first rail member disposed on the first cold side surface proximate a first portion of the first outer perimeter, the first rail member having a first outer wall and a first inner wall, a first undercut portion of the first cold side surface proximate the first inner wall of the first rail member, and a first orifice extending through the first rail member, from the first inner wall to the first outer wall. In various embodiments, the second panel includes a second hot side surface having a second outer perimeter, a second cold side surface spaced from the second hot side surface, a second rail member disposed on the second cold side surface proximate a second portion of the second outer perimeter, the second rail member having a second outer wall and a second inner wall, a second undercut portion of the second cold side surface proximate the second inner wall of the second rail member, and a second orifice extending through the second rail member, from the second inner wall to the second outer wall. In various embodiments, the first rail member is positioned adjacent the second rail member and the first orifice is oriented to direct a flow of air toward the second outer wall and the second orifice is oriented to direct a flow of air toward the first outer wall.

In various embodiments, the first orifice includes a first inner opening positioned on the first inner wall, the first inner opening disposed at least partially within the first undercut portion. In various embodiments, the second orifice includes a second inner opening positioned on the second inner wall, the second inner opening disposed at least partially within the second undercut portion. In various embodiments, the first panel is positioned circumferentially adjacent the second panel. In various embodiments, the first panel is positioned axially adjacent the second panel. In various embodiments, a shell is configured to secure the first panel and the second panel within the gas turbine engine combustor. In various embodiments, a plurality of impingement holes extends through the shell toward the first panel and the second panel.

A method of cooling a gap between adjacently positioned first and second heat shield panels in a gas turbine engine combustor is disclosed. In various embodiments, the method includes positioning a first rail member of a first panel adjacent a second rail member of a second panel, the first rail member disposed on the first panel adjacent a first undercut portion and having a first orifice extending there through, and the second rail member disposed on the second panel adjacent a second undercut portion and having a second orifice extending there through. The first orifice may be oriented to direct a flow of air toward the second rail member and the second orifice may be oriented to direct a flow of air toward the first rail member. The method further includes flowing cooling air through the first orifice toward the second rail member and through the second orifice toward the first rail member. In various embodiments, the first orifice includes a first inner opening positioned on a first inner wall of the first rail member, the first inner opening disposed at least partially within the first undercut portion and the second orifice includes a second inner opening positioned on a second inner wall of the second rail member, the second inner opening disposed at least partially within the second undercut portion.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
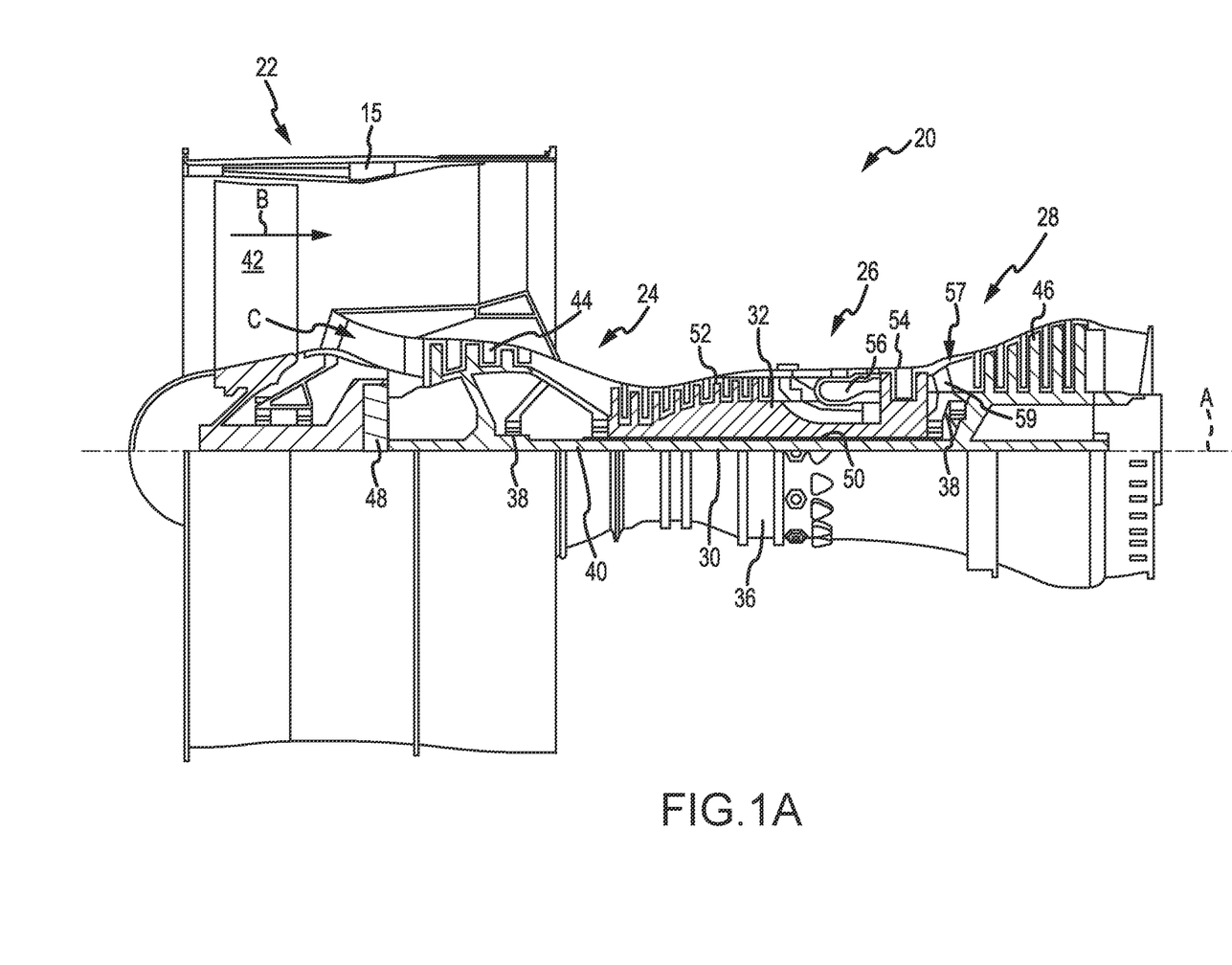
FIG. 1A is a cross sectional schematic view of a gas turbine engine, in accordance with various embodiments.

Referring now to the drawings, FIG. 1A schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 15, while the compressor section 24 drives air along a primary or core flow path C for compression and communication into the combustor section 26 and then expansion through the turbine section 28. Although depicted as a two-spool turbofan gas turbine engine in the disclosed non-limiting embodiment, it will be understood that the concepts described herein are not limited to use with two-spool turbofans as the teachings may be applied to other types of turbine engines, including three-spool architectures.

The gas turbine engine 20 generally includes a low speed spool 30 and a high speed spool 32 mounted for rotation about an engine central longitudinal axis A relative to an engine static structure 36 via several bearing systems 38. It should be understood that various bearing systems at various locations may alternatively or additionally be provided and the location of the several bearing systems 38 may be varied as appropriate to the application. The low speed spool 30 generally includes an inner shaft 40 that interconnects a fan 42, a low pressure compressor 44 and a low pressure turbine 46. The inner shaft 40 is connected to the fan 42 through a speed change mechanism, which in this gas turbine engine 20 is illustrated as a fan drive gear system 48 configured to drive the fan 42 at a lower speed than the low speed spool 30. The high speed spool 32 includes an outer shaft 50 that interconnects a high pressure compressor 52 and a high pressure turbine 54. A combustor 56 is arranged in the gas turbine engine 20 between the high pressure compressor 52 and the high pressure turbine 54. A mid-turbine frame 57 of the engine static structure 36 is arranged generally between the high pressure turbine 54 and the low pressure turbine 46 and may include airfoils 59 in the core flow path C for guiding the flow into the low pressure turbine 46. The mid-turbine frame 57 further supports the several bearing systems 38 in the turbine section 28. The inner shaft 40 and the outer shaft 50 are concentric and rotate via the several bearing systems 38 about the engine central longitudinal axis A, which is collinear with their longitudinal axes.

The air in the core flow path is compressed by the low pressure compressor 44 and then the high pressure compressor 52, mixed and burned with fuel in the combustor 56, and then expanded over the high pressure turbine 54 and low pressure turbine 46. The low pressure turbine 46 and the high pressure turbine 54 rotationally drive the respective low speed spool 30 and the high speed spool 32 in response to the expansion. It will be appreciated that each of the positions of the fan section 22, the compressor section 24, the combustor section 26, the turbine section 28, and the fan drive gear system 48 may be varied. For example, the fan drive gear system 48 may be located aft of the combustor section 26 or even aft of the turbine section 28, and the fan section 22 may be positioned forward or aft of the location of the fan drive gear system 48.

Figure 1B:
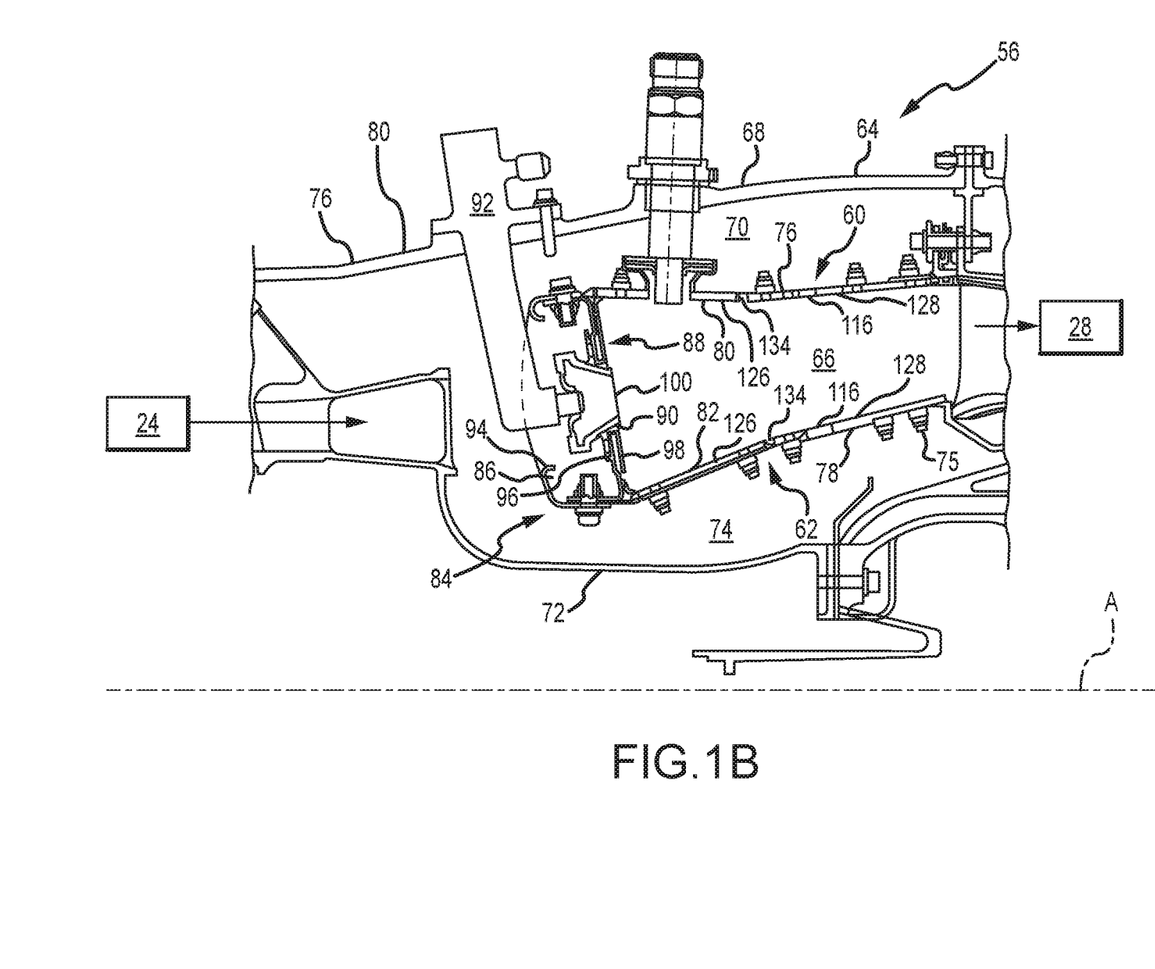
FIG. 1B is a cross sectional schematic view of a combustor section of a gas turbine engine, in accordance with various embodiments.

Referring to FIG. 1B, the combustor 56 may generally include an outer liner assembly 60, an inner liner assembly 62 and a diffuser case module 64 that surrounds the outer liner assembly 60 and the inner liner assembly 62. A combustion chamber 66, positioned within the combustor 56, has a generally annular configuration, defined by and comprising the outer liner assembly 60, the inner liner assembly 62 and a bulkhead liner assembly 88. The outer liner assembly 60 and the inner liner assembly 62 are generally cylindrical and radially spaced apart, with the bulkhead liner assembly 88 positioned generally at a forward end of the combustion chamber 66. The outer liner assembly 60 is spaced radially inward from an outer diffuser case 68 of the diffuser case module 64 to define an outer annular plenum 70. The inner liner assembly 62 is spaced radially outward from an inner diffuser case 72 of the diffuser case module 64 to define, in-part, an inner annular plenum 74. Although a particular combustor is illustrated, it should be understood that other combustor types with various combustor liner arrangements will also benefit from this disclosure. It should be further understood that the disclosed cooling flow paths are but an illustrated embodiment.

The combustion chamber 66 contains the combustion products that flow axially toward the turbine section 28. The outer liner assembly 60 includes an outer support shell 76 and the inner liner assembly 62 includes an inner support shell 78. The outer support shell 76 supports one or more outer panels 80 and the inner support shell 78 supports one or more inner panels 82. Each of the outer panels 80 and the inner panels 82 may be formed of a plurality of floating panels that are generally rectilinear and manufactured from, for example, a nickel based super alloy that may be coated with a ceramic or other temperature resistant material, and are arranged to form a panel configuration mounted to the respective outer support shell 76 and inner support shell 78. In various embodiments, the combination of the outer support shell 76 and the outer panels 80 is referred to an outer heat shield or outer heat shield liner, while the combination of the inner support shell 78 and the inner panels 82 is referred to as an inner heat shield or inner heat shield liner. In various embodiments, the panels are secured to the shells via one or more attachment mechanisms 75, which may each comprise a threaded stud and nut assembly.

The combustor 56 further includes a forward assembly 84 that receives compressed airflow from the compressor section 24 located immediately upstream. The forward assembly 84 generally includes an annular hood 86, a bulkhead liner assembly 88, and a plurality of swirlers 90 (one shown). Each of the swirlers 90 is aligned with a respective one of a plurality of fuel nozzles 92 (one shown) and a respective one of a plurality of hood ports 94 (one shown) to project through the bulkhead liner assembly 88; generally, the pluralities of swirlers 90, fuel nozzles 92 and hood ports 94 are circumferentially distributed about the annular hood 86 and the bulkhead liner assembly 88. The bulkhead liner assembly 88 includes a bulkhead support shell 96 secured to the outer liner assembly 60 and to the inner liner assembly 62 and a plurality of bulkhead panels 98 secured to the bulkhead support shell 96; generally, the bulkhead panels 98 are circumferentially distributed about the bulkhead liner assembly 88. The bulkhead support shell 96 is generally annular and the plurality of bulkhead panels 98 is segmented, typically one panel to each of the fuel nozzles 92 and swirlers 90. The annular hood 86 extends radially between, and is secured to, the forward-most ends of the outer liner assembly 60 and the inner liner assembly 62. Each of the hood ports 94 receives a respective one of the plurality of fuel nozzles 92 and facilitates the direction of compressed air into the forward end of the combustion chamber 66 through a respective one of a plurality of swirler openings 100. Each of the fuel nozzles 92 may be secured to the diffuser case module 64 and project through a respective one of the hood ports 94 and into a respective one of the swirlers 90.

The forward assembly 84 introduces core compressed air into the forward section of the combustion chamber 66 while the remainder of the compressed air enters the outer annular plenum 70 and the inner annular plenum 74. The plurality of fuel nozzles 92 and adjacent structure generate a blended fuel-air mixture that supports stable combustion in the combustion chamber 66. Air in the outer annular plenum 70 and the inner annular plenum is also introduced into the combustion chamber 66 via a plurality of orifices 116, which may include dilution holes or air feed holes of various dimension. The outer support shell 76 may also include a plurality of impingement holes (discussed further below) that introduce cooling air from the outer annular plenum 70 into a space between the outer support shell 76 and a cool side of the outer panels 80. The cooling air is then communicated through a plurality of effusion holes in the outer panels 80 to form a cooling air film across a hot side of the outer panels 80 to thermally protect the outer panels 80 from hot combustion gases. Similarly, the inner support shell 78 may include a plurality of impingement holes that introduce cooling air from the inner annular plenum 74 into a space between the inner support shell 78 and a cool side of the inner panels 82. The cooling air is then communicated through a plurality of effusion holes in the inner panels 82 to form a cooling air film across a hot side of the inner panels 82 to thermally protect the inner panels 82 from hot combustion gases.

Figure 1C:
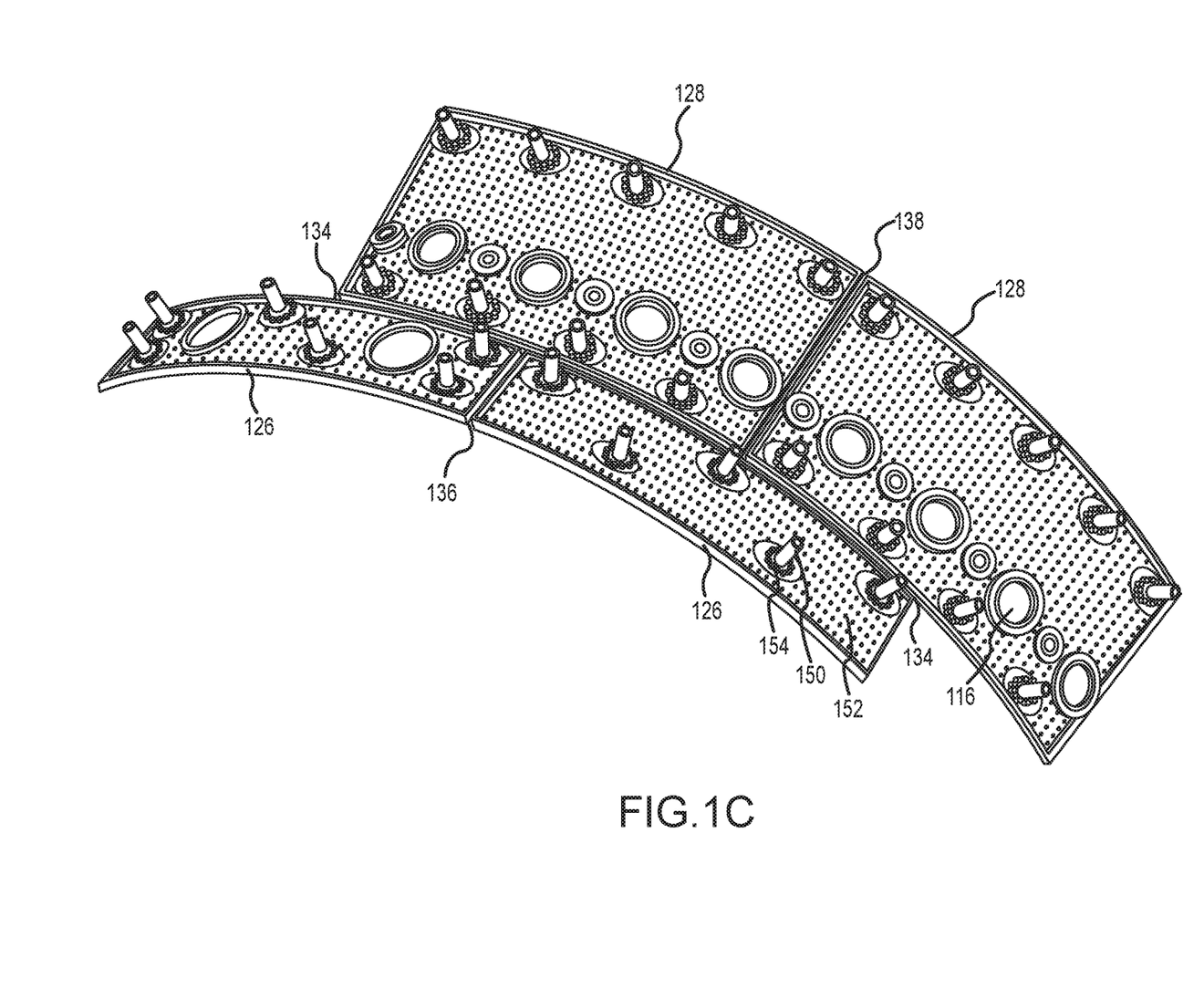
FIG. 1C is a perspective schematic view of a heat shield panel arrangement of a combustor, viewing from a cold side, according to various embodiments.

Turning now to FIG. 1C (with continued reference to FIG. 1B), an illustration of a configuration of circumferentially adjacent first panels 126 and circumferentially adjacent second panels 128 installed within the combustor 56 is shown. The circumferentially adjacent first panels 126 are installed to extend circumferentially about the combustion chamber 66 and form a first axially extending gap 136 between the circumferentially adjacent first panels 126. Similarly, the circumferentially adjacent second panels 128 are installed to extend circumferentially about the combustion chamber 66 and form a second axially extending gap 138 between the circumferentially adjacent second panels 128. A first circumferentially extending gap 134 is also formed between the circumferentially adjacent first panels 126 and the circumferentially adjacent second panels 128 when positioned axially adjacent one another. Similar axially extending and circumferentially extending gaps are formed between similar panels positioned throughout the combustion chamber 66. The first circumferentially extending gap 134, the first axially extending gap 136 and the second axially extending gap 138 accommodate movement or thermal expansion of the circumferentially adjacent first panels 126 and the circumferentially adjacent second panels 128. Also shown in FIG. 1C is the plurality of orifices 116, that may include dilution holes or air feed holes of various dimension, a plurality of effusion holes 152 and a shield attachment mechanism, which includes a stud 150 and a plurality of spacer pins 154.

Figure 2:
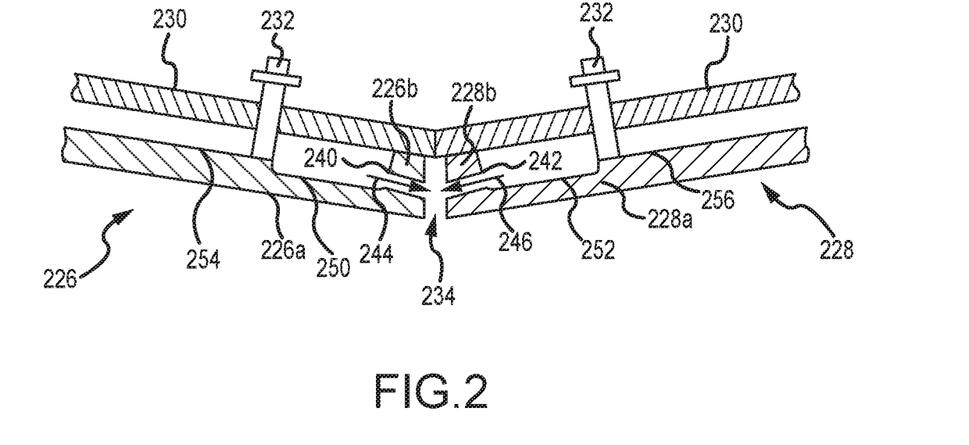
FIG. 2 is a side schematic view of two heat shield liner assemblies positioned adjacent one another and forming a gap between respective panel components of the heat shield liner assemblies, according to various embodiments.

Referring now to FIG. 2, a side view of a circumferentially extending gap 234 formed between a first liner 226 and a second liner 228 positioned adjacent the first liner 226 is shown. The first liner 226 includes a first panel 226a and a first panel rail member 226b extending from the first panel 226a. As installed, the first panel 226a defines a wall of a combustion chamber and the first panel rail member 226b extends outwardly and away from the combustion chamber toward a shell 230 to which the first panel 226a is mounted. An attachment mechanism 232 is configured to mount the first panel 226a to the shell 230. Similarly, the second liner 228 includes a second panel 228a and a second panel rail member 228b extending from the second panel 228a. The second panel 228a defines a wall of a combustion chamber and the second panel rail member 228b extends outwardly and away from the combustion chamber toward the shell 230 to which the second panel 228a is mounted. An attachment mechanism 232 is configured to mount the second panel 228a to the shell 230. The circumferentially extending gap 234 is formed between the first panel 226a and the second panel 228a, and the respective orientations of the first panel rail member 226b and the second panel rail member 228b determine the size of the gap 234. It may be desirable, for example, for cooling purposes, to not have the first panel 226a and the second panel 228a in contact with each other.

As illustrated, the first panel rail member 226b and the second panel rail member 228b can be configured substantially perpendicular to the respective first panel 226a and second panel 228a. Impingement cooling within the circumferentially extending gap 234 can be used. The impingement cooling can help relieve heating or oxidation of the first panel 226a and the second panel 228a, or the respective first panel rail member 226b and second panel rail member 228b, in the vicinity of the circumferentially extending gap 234 due to hot combustion gases flowing from the combustion chamber, entraining into the circumferentially extending gap 234, and resulting in burn back oxidation distress.

In various embodiments, as described more fully below, the impingement cooling may result from a first impingement orifice 240 extending through the first panel rail member 226b and directed toward the second panel rail member 228b and from a second impingement orifice 242 extending through the second panel rail member 228b and directed toward the first panel rail member 226b. The configuration establishes a first impingement cooling flow 244 directed from the first panel rail member 226b toward the second panel rail member 228b and a second impingement cooling flow 246 directed from the second panel rail member 228b toward the first panel rail member 226b. A first undercut portion 250 may be positioned in the first panel 226a adjacent the first panel rail member 226b. The first undercut portion 250 can be sized to provide space for the placement of a laser drill head adjacent the inner wall of the first panel rail member 226b to drill the first impingement orifice 240 by lowering the height of a first panel cold surface 254. Similarly, a second undercut portion 252 may be positioned in the second panel 228a adjacent the second panel rail member 228b. The second undercut portion 252 can be sized to provide space for the placement of a laser drill head adjacent the inner wall of the second panel rail member 228b to drill the second impingement orifice 242 by lowering the height of a second panel cold surface 256. The first undercut portion 250 and the second undercut portion 252 also prevent the first impingement orifice 240 and the second impingement orifice 242 from extending longitudinally through the first panel cold surface 254 and the second panel cold surface 256 at a shallow angle, thereby resulting in laser back strike—e.g., rather than having a circular orifice positioned on the inner wall of a rail member, the orifice extends as a longitudinal trough through part of the cold surface. While the first impingement orifice 240 and the second impingement orifice 242 are described as being formed by laser drilling, the disclosure contemplates other techniques for forming the orifices, such as mechanical drilling (e.g., using a high-speed twist drill), electrical discharge machining and water jet drilling.

Figure 3:
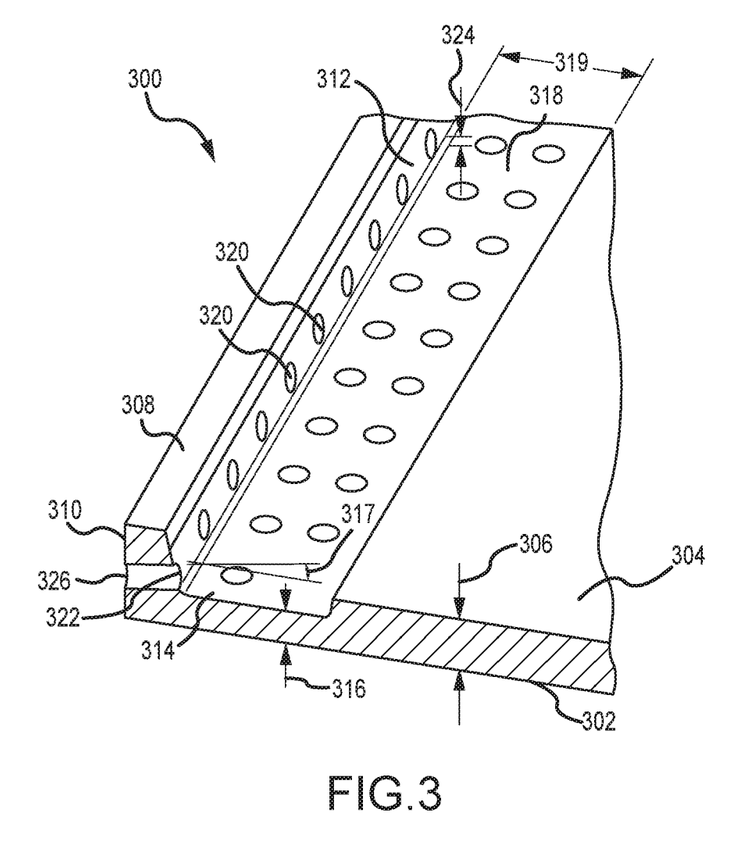
FIG. 3 is a perspective schematic view of a heat shield panel arrangement of a combustor, viewing from the cold side, according to various embodiments.

Referring now to FIG. 3, a schematic view of a heat shield panel 300 is provided, according to various embodiments. The heat shield panel 300 includes a hot side surface 302 and a cold side surface 304. A panel thickness 306 is defined by the distance between the hot side surface 302 and the cold side surface 304. The heat shield panel 300 includes an outer perimeter (e.g., rectangular, as illustrated in FIG. 1C) and a rail member 308 disposed on the cold side surface 304 proximate at least a first portion of the outer perimeter. In various embodiments, the rail member 308 extends about the entire outer perimeter (e.g., the four-sided rail member as illustrated in FIG. 1C). The rail member 308 generally includes an outer wall 310 and an inner wall 312. An undercut portion 314 of the cold side surface 304 is disposed proximate to and extends along the inner wall 312 of the rail member 308. The undercut portion 314 defines an undercut thickness 316 as the distance between the hot side surface 302 and an undercut surface 318. In various embodiments, the undercut portion 314 serves to reduce the panel thickness 306 to the undercut thickness 316 to facilitate drilling of one or more impingement orifices 320. In various embodiments, the undercut portion 314 extends an undercut length 319 from an adjacent rail member into the cold side surface 304. In various embodiments, the impingement orifices 320 are disposed to slope at a slope angle 317 from the outer wall 310 toward the inner wall 312.

As described above with reference to FIG. 2, the impingement orifices 320 provide a mechanism to cool hot combustion gases residing in gaps (both circumferential gaps and axial gaps) existing between adjacent liners or the panel components of the liners, and thereby also cooling the liners and the panel components thereof. The undercut portion 314 facilitates a desired value for the panel thickness 306 throughout a majority of the surface area of the heat shield panel 300 (e.g., the area of the hot side surface 302 or the cold side surface 304) while also facilitating desirable positioning of the impingement orifices 320 through the rail member 308. For example, the undercut portion 314 enables each of the impingement orifices 320 to have an inner opening 322 positioned entirely on the inner wall 312. Positioning the inner opening 322 entirely on the inner wall 312 avoids having to drill an elongated trench through the cold side surface 304, which would typically occur in instances where the undercut portion 314 is not included and the impingement orifices 320 are positioned close to the hot side surface 302. In various embodiments, the inner opening 322 may include a portion in contact with or tangent to the undercut surface 318, such that cooling fluid may flow smoothly across the undercut surface 318 and into the impingement orifices 320 with minimal obstruction. In various embodiments, the inner opening 322 may be positioned an offset distance 324 from the undercut surface 318. In various embodiments, the offset distance 324 will be less than the difference between the panel thickness 306 and the undercut thickness, such that the inner opening 322 will have a portion within the undercut portion 314 (e.g., the inner opening 322 will have at least a portion positioned below the cold side surface 304 were the surface extended to the inner wall 312 of the rail member 308). In various embodiments, each of the impingement orifices 320 will further include an outer opening 326 positioned on the outer wall 310 and positioned such that an impingement cooling flow is directed at an engine component (e.g., a second heat shield panel or rail member) positioned adjacent the heat shield panel 300.

In various embodiments, the panel thickness 306 may have a value within a range of from about 0.065 inches (1.65 mm) to about 0.045 inches (1.14 mm); in various embodiments, the panel thickness 306 may have a value within a range of from about 0.060 inches (1.52 mm) to about 0.050 inches (1.27 mm); and in various embodiments, the panel thickness 306 may have a value equal to about 0.055 inches (1.39 mm). In various embodiments, the undercut thickness 316 may have a value within a range of from about 0.045 inches (1.14 mm) to about 0.025 inches (0.63 mm); in various embodiments, the undercut thickness 316 may have a value within a range of from about 0.040 inches (1.01 mm) to about 0.030 inches (0.76 mm); and in various embodiments, the undercut thickness 316 may have a value equal to about 0.035 inches (0.88 mm). In various embodiments, the undercut length 319 may have a value within a range of from about 0.750 inches (19.05 mm) to about 0.250 inches (6.35 mm); in various embodiments, the undercut length 319 may have a value within a range of from about 0.600 inches (15.24 mm) to about 0.400 inches (10.16 mm); and in various embodiments, the undercut length 319 may have a value equal to about 0.500 inches (12.70 mm). In various embodiments, the slope angle 317 may have a value within a range of from about twelve degrees)(12° (0.209 rad) to about five degrees)(5° (0.087 rad); in various embodiments, the slope angle 317 may have a value within a range of from about ten degrees)(10° (0.174 rad) to about seven degrees) (7° (0.122 rad); and in various embodiments, the slope angle 317 may have a value equal to about eight and one-half degrees)(8.5° (0.148 rad). In various embodiments, the panel thickness 306 may have a value of about 0.055 inches (1.39 mm), the undercut thickness 316 may have a value of about 0.035 inches (0.88 mm), the undercut length 319 may have a value of about 0.500 inches (12.70 mm) and the slope angle 317 may have a value of about eight and one-half degrees)(8.5° (0.148 rad).

Figure 4:
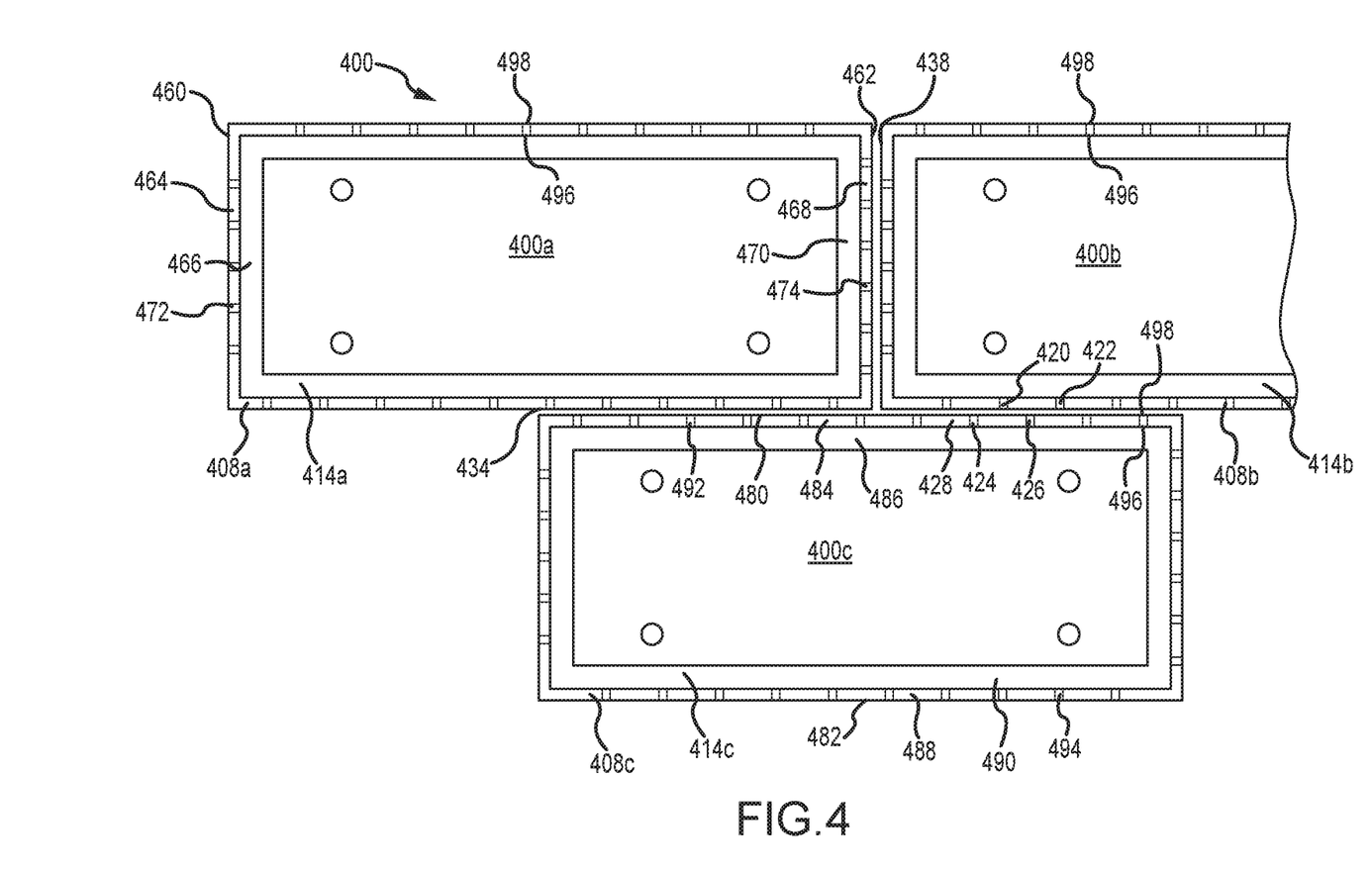
FIG. 4 is an overhead schematic view of a heat shield panel arrangement, viewing from the cold side, according to various embodiments.

Referring now to FIG. 4, a heat shield arrangement 400 is illustrated, having a first heat shield panel 400a positioned circumferentially adjacent to a second heat shield panel 400b, while a third heat shield panel 400c is positioned axially adjacent to both the first heat shield panel 400a and the second heat shield panel 400b. Similar to the above description with reference to FIG. 3, the first heat shield panel 400a may include a first rail member 408a and a first undercut portion 414a, both of which may extend about an outer perimeter of the first heat shield panel 400a. Likewise, the second heat shield panel 400b may include a second rail member 408b and a second undercut portion 414b and the third heat shield panel 400c may include a third rail member 408c and a third undercut portion 414c. An axially extending gap 438 is formed between the first heat shield panel 400a and the second heat shield panel 400b. A circumferentially extending gap 434 is formed between both the first heat shield panel 400a and the second heat shield panel 400b and the third heat shield panel 400c, which is positioned axially adjacent the former pair of heat shield panels.

Referring to the first heat shield panel 400a, the outer perimeter may include a first side 460 and a second side 462 spaced in a circumferential direction from the first side 460. The first side 460 may include a first rail member 464 and a first undercut portion 466 proximate the first rail member 464, while the second side 462 may include a second rail member 468 and a second undercut portion 470 proximate the second rail member 468. The first rail member 464 includes one or more first impingement orifices 472 extending there through, while the second rail member 468 includes one or more second impingement orifices 474 extending there through. In similar fashion, referring to the third heat shield panel 400c, the outer perimeter may include a first side 480 and a second side 482 spaced in an axial direction from the first side 480. The first side 480 may include a first rail member 484 and a first undercut portion 486 proximate the first rail member 484, while the second side 482 may include a second rail member 488 and a second undercut portion 490 proximate the second rail member 488. The first rail member 484 includes one or more first impingement orifices 492 extending there through, while the second rail member 488 includes one or more second impingement orifices 494 extending there through. Each of the first impingement orifices 492 and the second impingement orifices 494 includes a first opening 496 on an inner wall and a second opening 498 on an outer wall of the respective rail members. Each first opening 496 has a portion positioned within the respective undercut portion and on the inner wall, consistent with the description provided above. In various embodiments, all the impingement orifices throughout the various heat shield panels include a similar first opening 496 and second opening 498, consistent with the positional and shape characteristics described above. As illustrated in FIG. 4, each of the heat shield panels may have third and fourth sides, including third and fourth rail members, third and fourth undercut portions, and third and fourth pluralities of impingement orifices extending through the third and fourth rail members, respectively. The third and fourth pluralities of impingement orifices also include first openings on respective inner walls that are consistent with the positional characteristics in the description provided above.

As further illustrated in FIG. 4, the pluralities of impingement orifices positioned on adjacent facing sides may be staggered to ensure the outflow from one orifice is not directed toward the outflow of an adjacent orifice. For example, the second heat shield panel 400b includes a first orifice 420 and a second orifice 422 extending through the second rail member 408b. The third heat shield panel 400c includes a first orifice 424 and a second orifice 426 extending through a rail member 428 positioned axially adjacent the second rail member 408b. Each pair of impingement orifices may be staggered from the other, as illustrated. In various embodiments, however, the pairs of impingement orifices may line up directly with each other. The disclosure contemplates embodiments where either situation or both situations may be present, not only among pairs of adjacently facing impingement orifices, but among entire pluralities of adjacently facing impingement orifices.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A heat shield panel for a gas turbine engine combustor, comprising:
    a hot side defining a first surface having an outer perimeter;
    a cold side defining a second surface spaced from the first surface, the first surface and the second surface defining a panel thickness;
    a first rail member disposed on the cold side proximate a first portion of the outer perimeter, the first rail member having an outer wall and an inner wall;
    a first undercut portion within the second surface proximate the inner wall of the first rail member and the first portion, the first undercut portion defining an undercut surface and an undercut thickness between the first surface and the undercut surface, the undercut thickness being less than the panel thickness, the panel thickness extending throughout a majority of a surface area of the cold side of heat shield panel; and
    a first orifice extending through the first rail member, from the inner wall to the outer wall, wherein the first orifice includes an inner opening positioned on the inner wall, the inner opening having a portion disposed within the first undercut portion.

2. The heat shield panel of claim 1, wherein the first orifice includes an outer opening positioned on the outer wall, the outer opening positioned to direct a flow of air through the first orifice toward an engine component positioned adjacent the first rail member.

3. The heat shield panel of claim 2, wherein the engine component is a second heat shield panel positioned adjacent the first rail member.

4. The heat shield panel of claim 1, wherein the first orifice includes an outer opening positioned on the outer wall, the outer opening positioned closer to the first surface than the inner opening.

5. The heat shield panel of claim 1, wherein the outer perimeter has a rectangular shape and the first surface and the second surface have an arcuate shape.

6. The heat shield panel of claim 5, wherein the outer perimeter includes a first side and a second side spaced in a circumferential direction from the first side, the first side including the first rail member and the first undercut portion proximate the first rail member and the second side including a second rail member and a second undercut portion proximate the second rail member, the second rail member having a second orifice extending therethrough.

7. The heat shield panel of claim 5, wherein the outer perimeter includes a first side and a second side spaced in an axial direction from the first side, the first side including the first rail member and the first undercut portion proximate the first rail member and the second side including a second rail member and a second undercut portion proximate the second rail member, the second rail member having a second orifice extending therethrough.

8. The heat shield panel of claim 7, wherein the outer perimeter includes a third side and a fourth side spaced in a circumferential direction from the third side, the third side including a third rail member and a third undercut portion proximate the third rail member and the fourth side including a fourth rail member and a fourth undercut portion proximate the fourth rail member, the third rail member having a third orifice extending therethrough and the fourth rail member having a fourth orifice extending therethrough.

9. A heat shield for use in a gas turbine engine combustor, comprising:
    a first panel, including
        a first hot side surface having a first outer perimeter,
        a first cold side surface spaced from the first hot side surface, the first hot side surface and the first cold side surface defining a first panel thickness,
        a first rail member disposed on the first cold side surface proximate a first portion of the first outer perimeter, the first rail member having a first outer wall and a first inner wall,
        a first undercut portion within the first cold side surface proximate the first inner wall of the first rail member and the first portion, the first undercut portion defining a first undercut surface and a first undercut thickness between the first hot side surface and the first undercut surface, the first undercut thickness being less than the first panel thickness, the first panel thickness extending throughout a majority of a surface area of the first cold side surface of the first panel, and a first orifice extending through the first rail member, from the first inner wall to the first outer wall, wherein the first orifice includes a first inner opening positioned on the first inner wall, the first inner opening disposed at least partially within the first undercut portion; and a second panel, including
- a second hot side surface having a second outer perimeter,
- a second cold side surface spaced from the second hot side surface, the second hot side surface and the second cold side surface defining a second panel thickness,
- a second rail member disposed on the second cold side surface proximate a second portion of the second outer perimeter, the second rail member having a second outer wall and a second inner wall,
- a second undercut portion within the second cold side surface proximate the second inner wall of the second rail member and the second portion, the second undercut portion defining a second undercut surface and a second undercut thickness between the second hot side surface and the second undercut surface, the second undercut thickness being less than the second panel thickness, the second panel thickness extending throughout a majority of a surface area of the second cold side surface of the second panel, and
- a second orifice extending through the second rail member, from the second inner wall to the second outer wall;
- wherein the first rail member is positioned adjacent the second rail member and the first orifice is oriented to direct a first flow of air toward the second outer wall and the second orifice is oriented to direct a second flow of air toward the first outer wall.

10. The heat shield of claim 9, wherein the second orifice includes a second inner opening positioned on the second inner wall, the second inner opening disposed at least partially within the second undercut portion.

11. The heat shield of claim 10, wherein the first panel is positioned circumferentially adjacent the second panel.

12. The heat shield of claim 10, wherein the first panel is positioned axially adjacent the second panel.

13. The heat shield of claim 10, further comprising a shell configured to secure the first panel and the second panel within the gas turbine engine combustor.

14. The heat shield of claim 13, further comprising a plurality of impingement holes extending through the shell toward the first panel and the second panel.

15. A method of cooling a gap between adjacently positioned a first heat shield panel and a second heat shield panel in a gas turbine engine combustor, the first heat shield panel comprising:
- a hot side defining a first surface having an outer perimeter;
- a cold side defining a second surface spaced from the first surface, the first surface and the second surface defining a panel thickness;

the method comprising:
- positioning a first rail member of the first heat shield panel adjacent a second rail member of the second heat shield panel, the first rail member being disposed on the cold side proximate a first portion of the outer perimeter, the first rail member having an outer wall and an inner wall, the first rail member disposed on the first panel adjacent a first undercut portion, the first undercut portion being within the second surface proximate the inner wall of the first rail member and the first portion, the first undercut portion defining an undercut surface and an undercut thickness between the first surface and the undercut surface, the undercut thickness being less than the panel thickness, the panel thickness extending throughout a majority of a surface area of the cold side of heat shield panel; and
- the first rail member having a first orifice extending from the inner wall to the outer wall, wherein the first orifice includes a first inner opening positioned on the inner wall, the first inner opening having a portion disposed within the first undercut portion, and the second rail member disposed on the second heat shield panel adjacent a second undercut portion and having a second orifice extending through the second rail member,
- wherein the first orifice is oriented to direct a first flow of cooling air toward the second rail member and the second orifice is oriented to direct a second flow of cooling air toward the first rail member; and
- flowing the first flow of cooling air through the first orifice toward the second rail member and flowing the second flow of cooling air through the second orifice toward the first rail member.

16. The method of claim 15, wherein the second orifice includes a second inner opening positioned on a second inner wall of the second rail member, the second inner opening disposed at least partially within the second undercut portion.

* * * * *